Sept. 24, 1957 H. H. SMITH 2,807,087
PRUNING SHEARS
Filed May 28, 1956
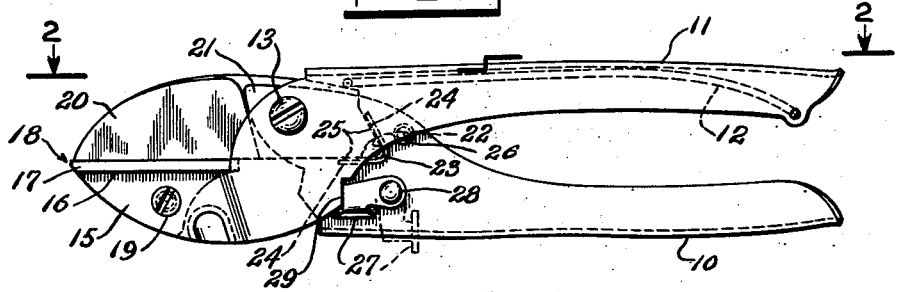
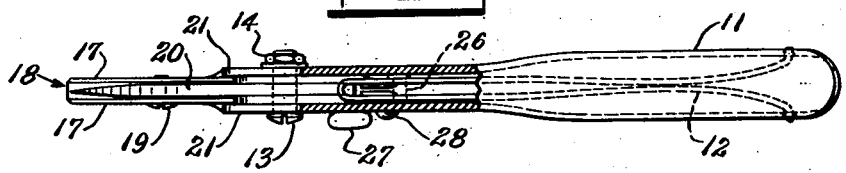
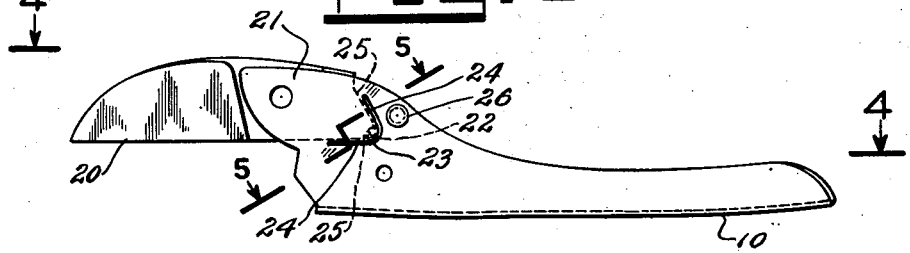
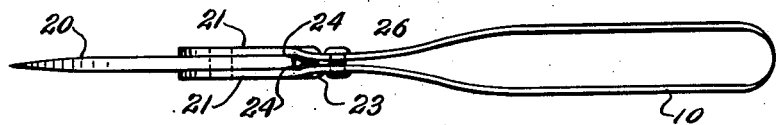
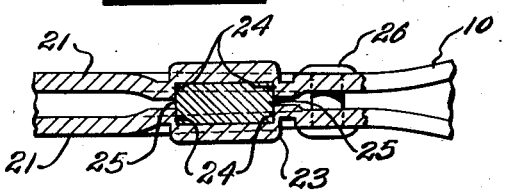
INVENTOR.
HAROLD H. SMITH
BY
H. G. Manning
ATTORNEY

United States Patent Office 2,807,087
Patented Sept. 24, 1957

2,807,087
PRUNING SHEARS

Harold H. Smith, Watertown, Conn., assignor to Seymour Smith & Son, Inc., Oakville, Conn., a corporation of Connecticut Application May 28, 1956, Serial No. 587,821

3 Claims. (Cl. 30—186)

This invention relates to agricultural implements and more particularly to a movable pruning shear member in which the cutting blade is formed separately from the handle to which it is rigidly secured.

One object of this invention is to provide a device of the above nature in which the sides of the blade holder handle are swaged inwardly to form V-shaped pockets for the rear corner of the blade.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawing one form in which the invention may conveniently be embodied in practice.

In the drawing,

Fig. 1 represents a side elevation of one form of pruning shears embodying the present invention.

Fig. 2 is a side view of the same, partly in section, taken on the line 2—2 of Fig. 1.

Fig. 3 is a side elevation of the cutter and its handle shown partially assembled.

Fig. 4 is a view of the cutter and handle, looking in the direction of the arrows 4—4 of Fig. 3.

Fig. 5 is a cross section on an enlarged scale of the assembled handle and cutter, taken on the line 5—5 of Fig. 3.

Referring now to the drawing in which like reference numerals denote corresponding parts throughout the several views, the numerals 10 and 11 indicate the movable and stationary jaws respectively, each of said jaws 10 and 11 being preferably formed into U-shaped cross section by stamping from a sheet metal blank. The jaws 10 and 11 are adapted to be normally held in open position by an elongated flexible wire spring 12 located within the bent-up side walls of the stationary jaw.

The forward end of the movable jaw 10 is pivotally connected within the bent-up side walls of the stationary jaw 11 by a pivot bolt 13 having a retaining nut 14.

The forward end of the stationary jaw member 11 is arcuate in shape and has a pair of parallel side walls 15 provided with straight inner edges 16 against which flanges 17 of a soft metal anvil plate 18 are adapted to rest. The anvil plate 18 is adapted to be held between the walls 15 of the stationary jaw 11 by means of a detachable screw stud 19 passing through said walls and said anvil plate.

The upper surface of the anvil plate 18 is adapted to be engaged by the sharp edge of a cutting blade 20 which is removably fitted between the parallel forward side walls 21 of the movable jaw 10 and held therein by means of the pivot bolt 13.

In order to prevent the cutting blade 20 from rotating with respect to the jaws 10, the rear end of said blade 20 is provided with a projecting angular nose 22 which is adapted to be closely fitted within a pair of opposed V-shaped pockets 23 formed in each of the forward side walls 21 of the movable jaw 10, the portions of the side walls 21 to the rear and below said pocket being inwardly indented as by a die, as shown in Fig. 5, whereby inwardly extending shoulders 24 will be formed to abut against the rear edges 25 of the projecting nose 22. The side walls 21 may also be reinforced rearwardly of the pocket 23 by a rivet 26.

In order to lock the jaws of the pruning shears in closed position when not in use, a latch arm 27 is pivotally attached to the movable jaw 10 by means of a rivet 28. By means of this construction, the latch arm 27 may be moved into engagement with a notch 29 provided in one of the side walls 15 of the stationary jaw 11 to hold the jaws 10 and 11 in closed position.

The present invention is an improvement over that disclosed in prior Patent No. 1,963,564, issued to Justin L. Smith and Harold H. Smith on June 19, 1934, and Patent No. 1,995,044, issued to William R. Smith on March 19, 1935.

While there has been disclosed in this specification one form in which the invention may be embodied, it is to be understood that this form is shown for the purpose of illustration only, and that the invention is not limited to the specific disclosure, but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. In pruning shears of the character comprising a pair of pivotally connected members adapted to support a cutting blade and an anvil respectively, the combination including a jaw member of U-shaped cross-section having forwardly disposed substantially parallel side walls, a cutting blade having a rearwardly projecting nose, a portion of one of said side walls having pocket means corresponding to the configuration of the nose of said cutting blade integrally formed therein.

2. In pruning shears of the character comprising a pair of pivotally connected members adapted to support a cutting blade and an anvil respectively, the combination including a jaw member of U-shaped cross-section having forwardly disposed substantially parallel side walls, portions of said side walls being inwardly offset to form a shoulder to abut against the rear edge of a cutting blade.

3. In pruning shears of the character comprising a pair of pivotally connected members adapted to support a cutting blade and an anvil respectively, the combination including a holder member of U-shaped cross-section having forwardly disposed substantially parallel side walls, said side walls having aligned apertures to receive a pivot pin to retain a cutting blade therebetween, said side walls being inwardly offset adjacent two sides of a portion of a cutting blade positioned between said walls to prevent relative rotation of said blade.

References Cited in the file of this patent
UNITED STATES PATENTS

| | | |
|---|---|---|
| 1,995,044 | Smith | Mar 19, 1935 |
| 2,574,354 | Smith | Nov. 6, 1951 |